United States Patent
Kubo et al.

[11] Patent Number: 5,966,086
[45] Date of Patent: Oct. 12, 1999

[54] MICROCOMPUTER HAVING AN OUTPUT CIRCUIT WITH A RESISTOR LADDER

[75] Inventors: Kenji Kubo; Toyokatsu Nakajima; Hiroyuki Maemura, all of Hyogo, Japan

[73] Assignees: Mitsubishi Electric Semiconductor Software Co., LTD, Hyogo; Mitsubishi Denki Kabushiki Kaisha, Tokyo, both of Japan

[21] Appl. No.: 08/933,276

[22] Filed: Sep. 18, 1997

[30] Foreign Application Priority Data

Apr. 7, 1997 [JP] Japan .................................. 9-088480

[51] Int. Cl.⁶ .................................................. H03M 1/00
[52] U.S. Cl. ........................... 341/155; 326/33; 327/540
[58] Field of Search ........................ 341/155; 326/33; 327/538, 540, 545

[56] References Cited

U.S. PATENT DOCUMENTS 5,132,555  7/1992  Takahashi ................. 327/540
5,422,642  6/1995  Chung et al. .............. 341/155

FOREIGN PATENT DOCUMENTS

| 1238226 | 9/1989 | Japan . |
| 2-43813 | 2/1990 | Japan . |
| 3-093261 | 4/1991 | Japan . |
| 8-265155 | 10/1996 | Japan . |

*Primary Examiner*—Howard L. Williams
*Attorney, Agent, or Firm*—Leygid, Voit & Mayer, Ltd.

[57] ABSTRACT

A microcomputer includes an operation circuit for performing an operation using a reference voltage. A reference voltage input terminal receives the reference voltage from an external device. An output circuit outputs an output signal from the microcomputer to an external destination. The level of the output signal depends on the reference voltage input through the reference voltage input terminal.

6 Claims, 6 Drawing Sheets

MICROCOMPUTER HAVING AN OUTPUT CIRCUIT WITH A RESISTOR LADDER

BACKGROUND OF THE INVENTION

1. Field of the Invention

The present invention relates to a microcomputer capable of interfacing with a peripheral circuit having a signal level different from that of the microcomputer.

2. Description of the Prior Art

Today, semiconductors used especially in communication control applications may sometimes need to address a signal level different from an operating voltage level of the semiconductors. Malfunction is known to occur in some of such contingencies.

FIG. 6 is a block diagram of an output circuit incorporated in a conventional microcomputer. In FIG. 6, reference numeral 10 represents a microcomputer; 11 represents a power terminal to which a supply voltage VDD1 is fed; 12 represents a serial output terminal of the microcomputer 10; 13 represents a step-down circuit for lowering the supply voltage VDD1 coming from the power terminal 11 down to an output voltage VDD2; 14 represents a P-channel MOSFET; and 15 represents an N-channel MOSFET. The gate of the P-channel MOSFET 1 and that of the N-channel MOSFET 15 are supplied with a signal S1 coming from a stage upstream of the output circuit. The serial output terminal 12 outputs a signal T1.

The output circuit of FIG. 6 works as follows. FIG. 7 is a timing chart showing temporal changes of signals included in FIG. 6. In FIG. 7, reference characters VOH represent a lower limit of a High-level signal output from the serial output terminal 12. That is, VOH denotes a lower limit of the specified High level of the signal to a peripheral circuit.

The supply voltage VDD1 entering from the power terminal 11 powers a CPU (not shown) and other parts of the microcomputer 10 and is sent to the step-down circuit 13. The step-down circuit 13 brings the supply voltage VDD1 down to the output voltage VDD2 that is fed to an output stage made up of the P-channel MOSFET 14 and N-channel MOSFET 15. That is, whereas the circuits inside the microcomputer 10 operate on the supply voltage VDD1, the level of the signal output from the serial output terminal 12 falls within the voltage range of the output voltage VDD2 output from the step-down circuit 13.

The supply voltage VDD1 may decrease due to an increase in the load on the microcomputer 10 or because of a lack of capacity of a power source that powers the microcomputer 10, as shown in FIG. 7. In such cases, the supply voltage VDD1 may still be sufficient to operate the microcomputer 10 but let the output voltage VDD2 of the step-down circuit 13 decline, thereby lowering the level of the signal output from the serial output terminal 12. If the output signal T1 drops below the lower limit of the High-level signal to the peripheral circuit, the peripheral circuit can malfunction.

Conventional microcomputers of the above constitution are thus faced with a problem: a drop in the supply voltage to the microcomputer triggers a decrease in the signal level to a peripheral circuit, causing the latter to malfunction.

SUMMARY OF THE INVENTION

It is therefore an object of the present invention to overcome the above and other disadvantages of the related art and to provide a microcomputer capable of forestalling a peripheral circuit malfunction that may be caused by a decreased voltage level in the output signal from the microcomputer.

In carrying out the invention and according to one aspect thereof, there is provided a microcomputer having an operation circuit for performing a predetermined operation using a reference voltage. The microcomputer comprises: a reference voltage input terminal for inputting the reference voltage from outside the microcomputer; and an output circuit for outputting a signal from the microcomputer to an external destination, the output circuit operating on the reference voltage input through the reference voltage input terminal. The microcomputer of this constitution keeps the voltage level of its output signal constant in spite of fluctuations that may occur in the supply voltage, whereby malfunction of an external device connected to the microcomputer is prevented.

In a preferred structure according to the invention, the microcomputer may further comprise a voltage follower circuit for subjecting to current amplification the reference voltage input from the reference voltage input terminal, wherein the reference voltage having undergone current amplification is supplied as power to the output circuit. This structure forestalls those fluctuations in the reference voltage which may result from a growing load on the output circuit.

In another preferred structure according to the invention, the output circuit in the microcomputer may have a P-channel field effect transistor and an N-channel field effect transistor connected in series. This structure prevents any drop in the voltage level of the output signal from the microcomputer when the supply voltage to the latter varies.

In a further preferred structure according to the invention, the operation circuit in the microcomputer may include an A/D converter for converting an analog signal to a digital signal. With this structure, the A/D converter using the reference voltage allows a signal to be output at a stable voltage level.

In an even further preferred structure according to the invention, the A/D converter in the microcomputer may have a ladder resistance part having a plurality of resistors connected in series. An end of the ladder resistance part is supplied with the reference voltage. One of connecting points of the serially connected resistors constituting the ladder resistance part is connected electrically to an input of the voltage follower circuit. This structure allows a signal to be output at a stable voltage level even where the output signal differs in voltage level from the reference voltage.

In a still further preferred structure according to the invention, the A/D converter in the microcomputer may have a ladder resistance part having a plurality of resistors connected in series. An end of the ladder resistance part is supplied with the reference voltage. The microcomputer may further comprise a switch that is controlled by software so as to cause one of connecting points of the serially connected resistors constituting the ladder resistance part to be selected and connected electrically to an input of the voltage follower circuit. With this structure, suitable changes in software alone may address diverse combinations of reference voltage and output signal voltage level while the hardware of the microcomputer is left intact.

These and other objects, features and advantages of the invention will become more apparent upon a reading of the following description and appended drawings.

DETAILED DESCRIPTION OF THE PREFERRED EMBODIMENTS

Preferred embodiments of this invention will now be described in detail with reference to the accompanying drawings.

First Embodiment

Figure 1:
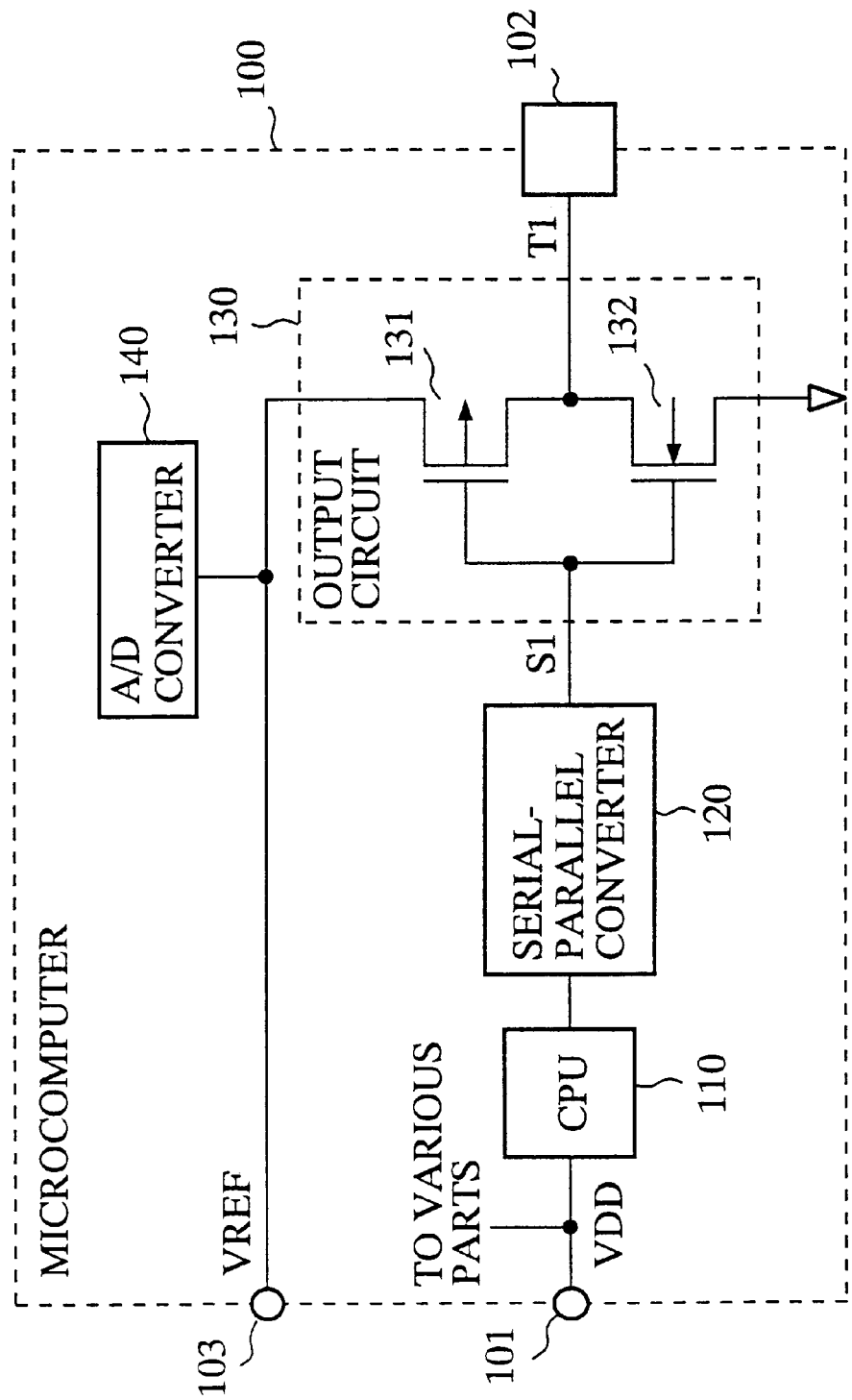
FIG. 1 is a block diagram of a microcomputer practiced as a first embodiment of the invention.

FIG. 1 is a block diagram of a microcomputer practiced as the first embodiment of the invention. In FIG. 1, reference numeral 100 represents a microcomputer. The microcomputer 100 comprises a CPU 110, a serial-parallel converter 120 for converting a parallel signal to a serial signal, an output circuit 130 for inversely amplifying the signal output from the serial-parallel converter 120, and an A/D converter 140 (i.e., operation circuit). Reference numeral 101 represents an input terminal that receives a supply voltage VDD; 102 represents a serial output terminal that outputs a signal T1 from the output circuit 130 to external devices; and 103 represents a reference voltage input terminal that receives a reference voltage VREF fed to the A/D converter 140.

The output circuit 130 comprised a P-channel MOSFET (P-channel field effect transistor) 131 and an N-channel MOSFET (N-channel field effect transistor) 132 connected in series. The gates of the two MOSFETs are commonly connected to receive a serial signal S1 from the serial-parallel converter 120.

The first embodiment works as follows: the supply voltage VDD input through the input terminal 101 is used to power the CPU 110 and other components of the microcomputer 100. The reference voltage VREF for the A/D converter 140 is input through the reference voltage input terminal 103. The reference voltage VREF is fed to the A/D converter 140 and is supplied as power to the output circuit 130.

When the serial signal S1 from the serial-parallel converter 120 is brought High, the P-channel MOSFET 131 is turned off and the N-channel MOSFET 132 is turned on. This drives Low the output signal T1 of the output circuit 130. Conversely, when the serial signal Si is driven Low, the P- and N-channel MOSFETs 131 and 132 are turned on and off respectively. This brings High the output signal T1 of the output circuit 130. When driven High, the output signal T1 attains substantially the level of the reference voltage VREF. The reference voltage VREF supplied from the reference voltage input terminal 103 is a stabilized voltage and is independent of the supply voltage VDD fed to the CPU 110. This means that a constant voltage is supplied irrespective of load fluctuations within the microcomputer 100. Thus as long as the reference voltage VREF is set to be equal to the High level of the output signal T1, the output level can be held constant.

Figure 2:
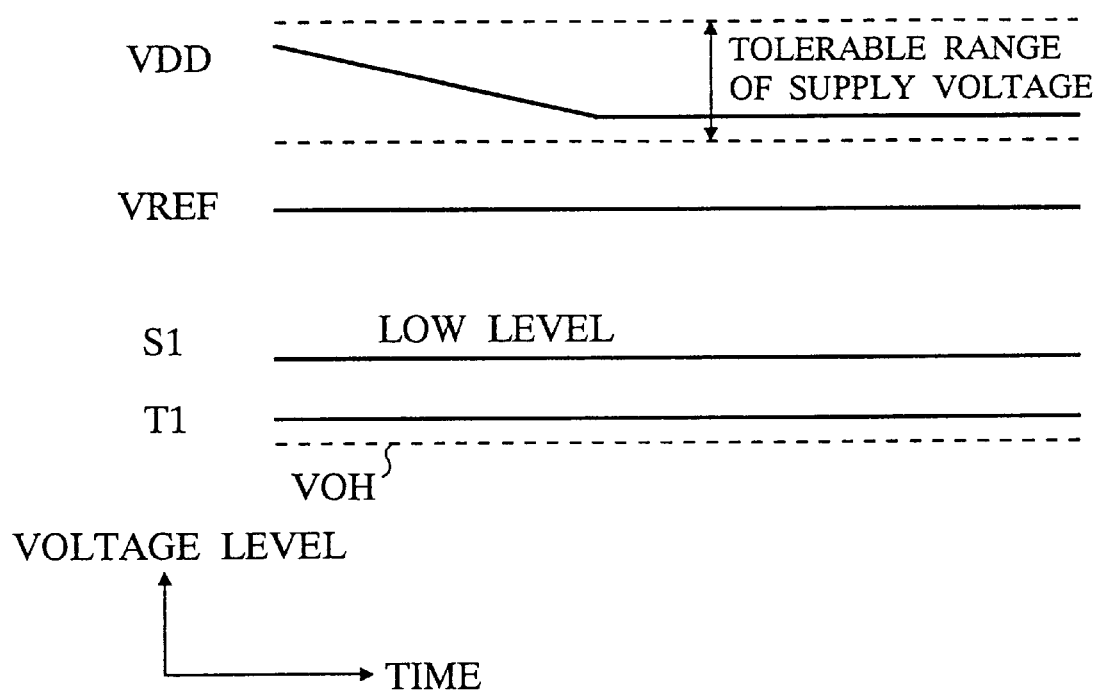
FIG. 2 is a timing chart showing temporal changes of signals at key parts of the first embodiment.

FIG. 2 is a timing chart showing temporal changes of signals included in FIG. 1. In FIG. 2, reference characters VOH represent a lower limit of the High-level signal output from the serial output terminal 102. That is, VOH denotes a lower limit of the specified High level of the signal to a peripheral circuit. As illustrated, the High level of the signal T1 remains constant even if the supply voltage VDD declines due to load fluctuations within the microcomputer 100 or because of a malfunction of a power supply circuit connected to the microcomputer 100. During the High-level signal output, the output signal will not drop below the lower voltage limit VOH of the peripheral circuit. This makes it possible to protect the peripheral circuit connected externally to the microcomputer 100 from developing a malfunction attributable to a drop in the supply voltage VDD.

Second Embodiment

Figure 3:
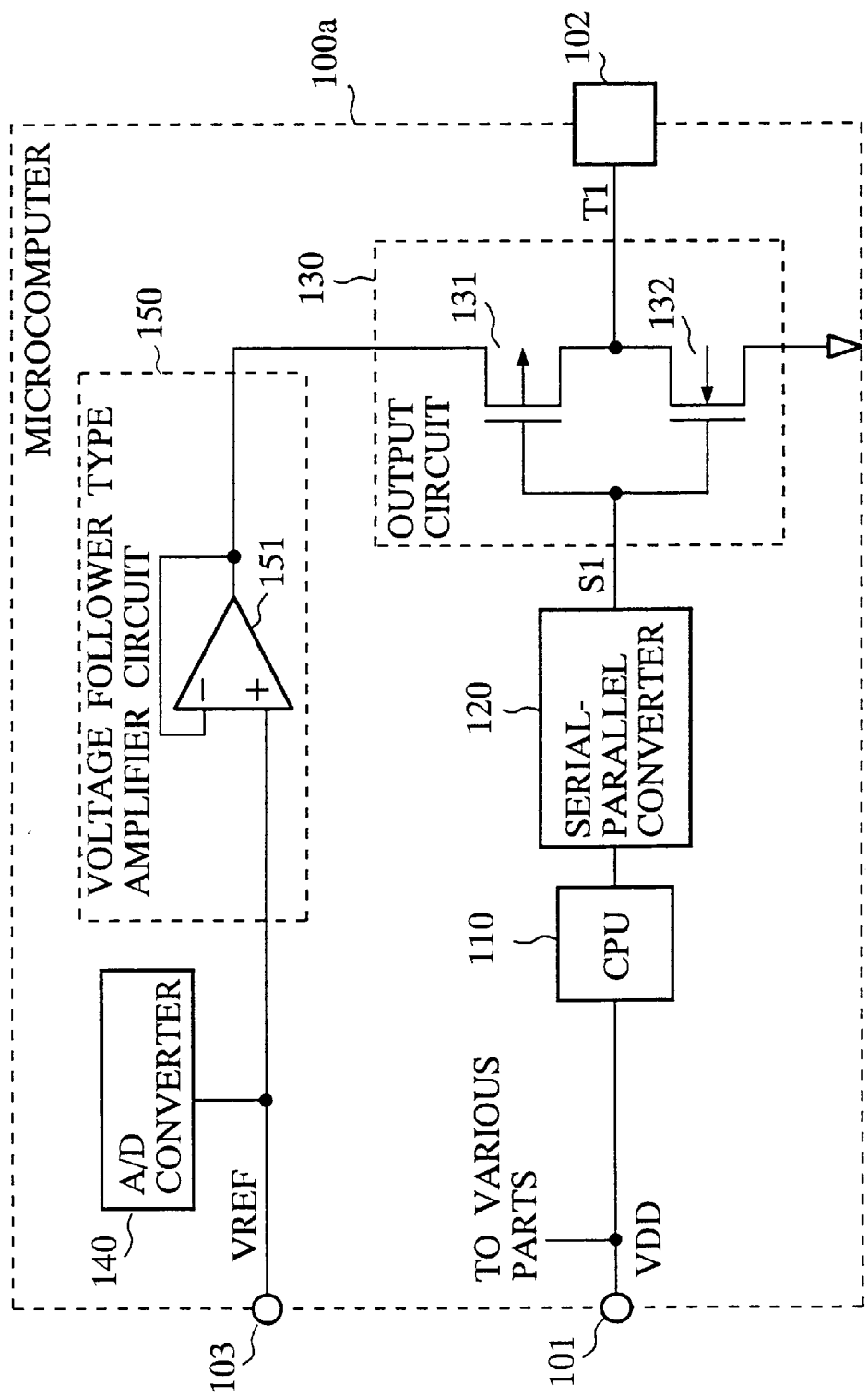
FIG. 3 is a block diagram of a microcomputer practiced as a second embodiment of the invention.

FIG. 3 is a block diagram of a microcomputer practiced as the second embodiment of the invention. In FIG. 3, those parts with their counterparts already shown in FIG. 1 are given the same reference numerals, and descriptions of such parts are omitted where repetitive. In FIG. 3, reference numeral 100a stands for a microcomputer and 150 for a voltage follower type amplifier circuit (i.e., voltage follower circuit) that subjects the reference voltage VREF input through the reference voltage input terminal 103 to current amplification. The second embodiment is a variation of the first embodiment supplemented with the voltage follower type amplifier circuit 150. The reference voltage VREF entering from the reference voltage input terminal 103 is current-amplified by the voltage follower type amplifier circuit 150. The output of the amplifier circuit 150 is fed as power to the output circuit 130.

With the voltage follower type amplifier circuit 150 thus installed, dynamic operation of the output circuit 130 prevents the reference voltage VREF from fluctuating and thereby maintains the precision of conversion performance by the A/D converter 140. Furthermore, the High level at the serial output terminal 102 is stabilized. The voltage follower type amplifier circuit 150 is implemented in the form of operational amplifier 151 with its output terminal and its negative input terminal short-circuited. Because the reference voltage VREF is generally small in current capacity, the second embodiment furnished with the voltage follower type amplifier circuit 150 is especially effective in achieving stable performance. The operation of the second embodiment for outputting the signal T1 is the same as that of the first embodiment and will not be discussed further.

Third Embodiment

Figure 4:
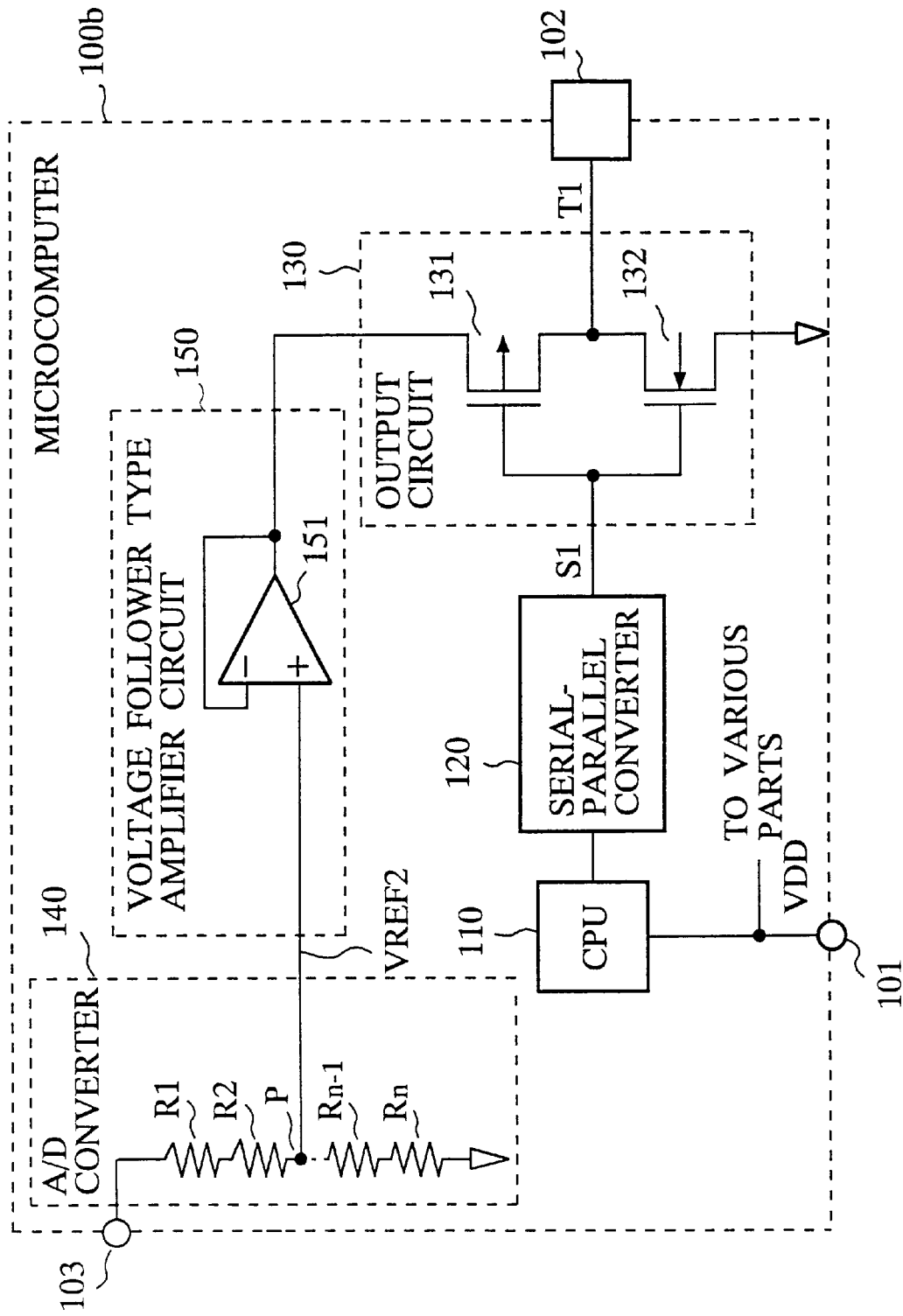
FIG. 4 is a block diagram of a microcomputer practiced as a third embodiment of the invention.

FIG. 4 is a block diagram of a microcomputer practiced as the third embodiment of the invention. In FIG. 4, those parts with their counterparts already shown in FIG. 3 are given the same reference numerals, and descriptions of such parts are omitted where repetitive. In FIG. 4, reference numeral 100b represents a microcomputer implemented as the third embodiment. R1, R2, . . . , Rn–1 and Rn stand for ladder resistors inside the A/D converter 140. In the third embodiment, the A/D converter 140 has the ladder resistors R1, R2, . . . , Rn–1 and Rn connected in series and one of connecting points P of the resistors is connected to an input terminal of the voltage follower type amplifier circuit 150. That is, the reference voltage VREF input from the reference voltage input terminal 103 is divided by the ladder resistors, and a voltage VREF2 at the connecting point P is supplied as power to the output circuit 130 via the voltage follower type amplifier circuit 150.

When the voltage level of the reference voltage VREF is different from a reference voltage level of an external peripheral circuit connected to the microcomputer 100b, the divided voltage VREF2 appropriate for the High level of the peripheral circuit is tapped from the ladder resistors and supplied to the output circuit 130. This allows the microcomputer 100b to output a stable High-level voltage signal to the outside regardless of the reference voltage VREF differing from the High-level voltage of the external peripheral circuit. The operation of the third embodiment for outputting the signal T1 is the same as that of the first embodiment and will not be discussed further.

The ladder resistors are intrinsic to the A/D converter 140. Utilizing these resistors eliminates the need to add a special circuit for converting the reference voltage VREF to the voltage VREF2.

Fourth Embodiment

Figure 5:
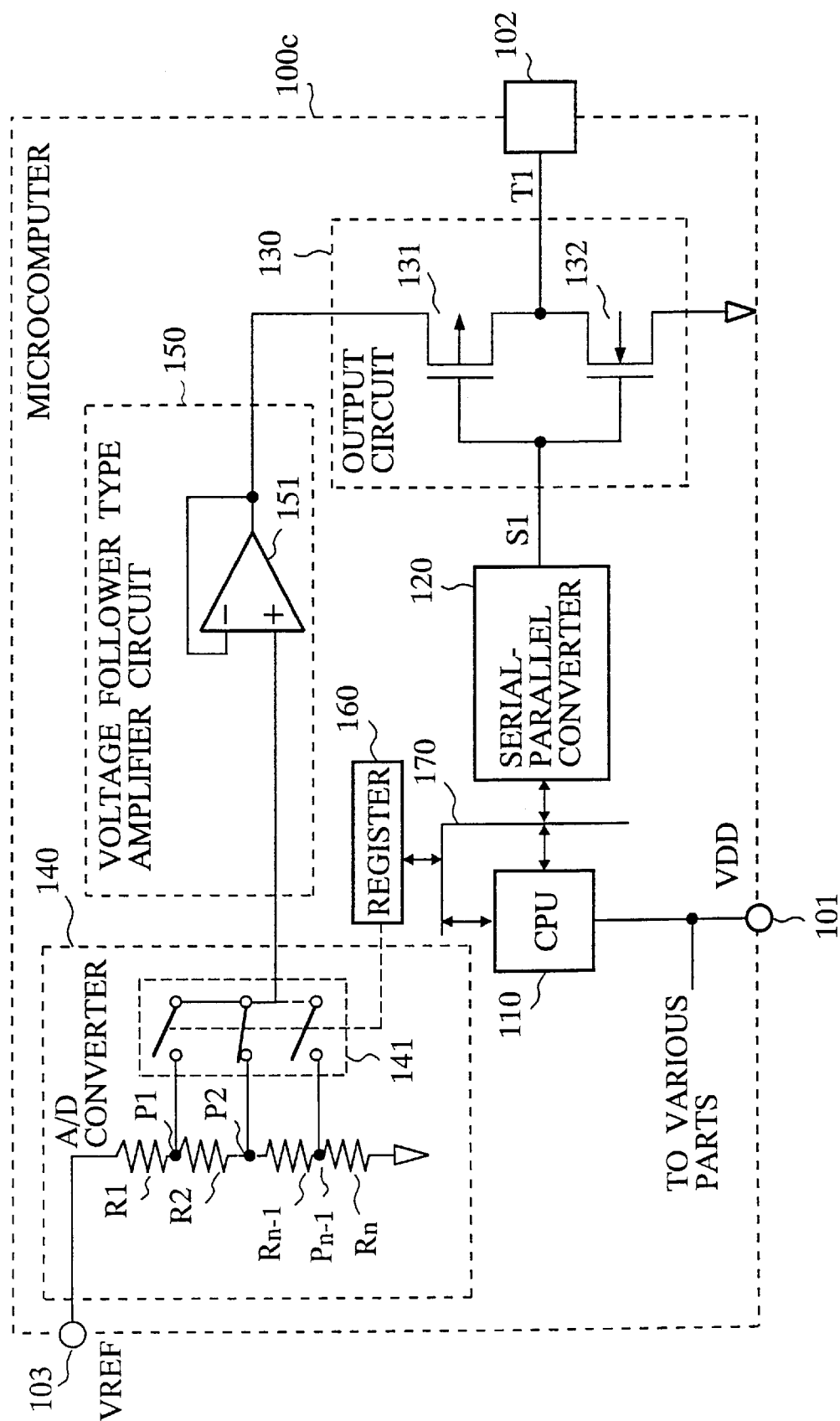
FIG. 5 is a block diagram of a microcomputer practiced as a fourth embodiment of the invention.
Figure 6:
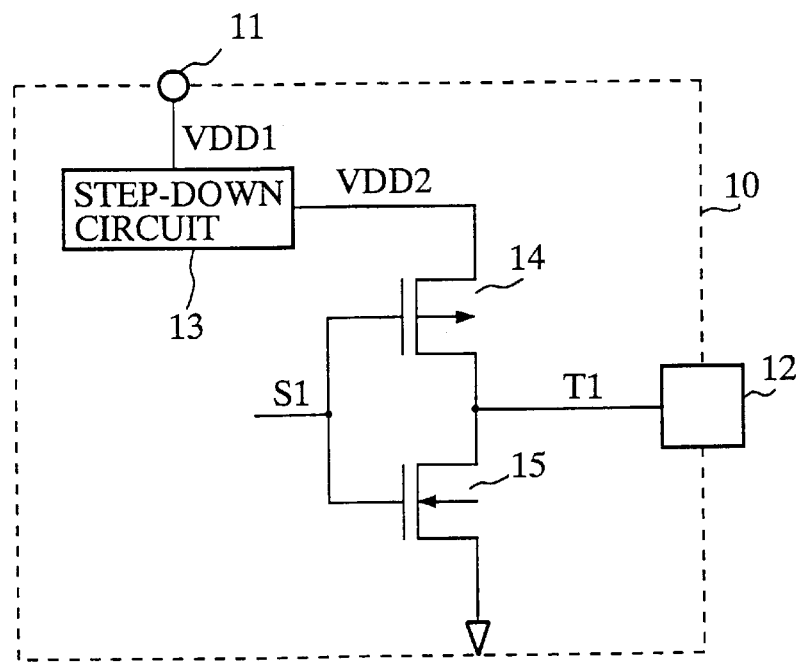
FIG. 6 is a block diagram showing a partial constitution of a conventional microcomputer.
Figure 7:
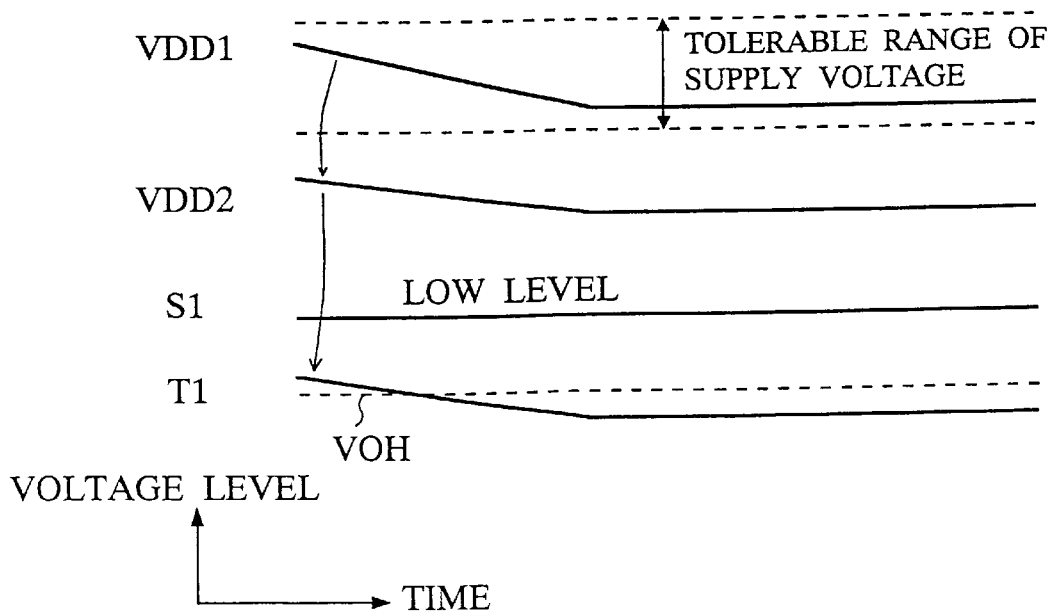
FIG. 7 is a timing chart showing temporal changes of signals at key parts of the conventional microcomputer.

FIG. 5 is a block diagram of a microcomputer practiced as the fourth embodiment of the invention. In FIG. 5, those parts with their counterparts already shown in FIG. 4 are given the same reference numerals, and descriptions of such parts are omitted where repetitive. In FIG. 5, reference numeral 100c represents a microcomputer implemented as the fourth embodiment; 141 represents a switch that selects one of connecting points P1 through Pn−1 of n resistors R1 through Rn−1 and connects the selected point electrically to the input terminal of the voltage follower type amplifier circuit 150; 160 represents a register that stores information identifying the connecting point to be selected by the switch 141 under control of the CPU 110; and 170 represents a bus line of the microcomputer 100c. On the basis of the value in the register 160, the switch 141 selects one of the connecting points P1 through Pn−1.

The fourth embodiment works as follows: upon power-up, the CPU 110 runs a suitable program to place in the register 160 information designating a specific connecting point to be selected. In accordance with the information put in the register 160, the switch 141 selects the connecting point and connects it electrically to the input terminal of the voltage follower type amplifier circuit 150. That is, the voltage at the connecting point selected by the program is fed as power to the output circuit 130 via the voltage follower type amplifier circuit 150. The fourth embodiment allows suitable changes in the program alone to address diverse combinations of the reference voltage VREF and a different High-level voltage of the peripheral circuit while the hardware of the CPU 110 is left intact.

While preferred embodiments of the invention have been described using specific terms, such descriptions are for illustrative purposes only, and it is to be understood that changes and variations may be made without departing from the spirit or scope of the following claims.

What is claimed is:

1. A microcomputer comprising:
   an operation circuit for performing an operation using a reference voltage signal and including:
      a reference voltage input terminal for receiving the reference voltage signal from outside said microcomputer;
      an analog-to-digital converter for converting an analog signal to a digital signal and having a resistor ladder including a plurality of resistors connected in series, a plurality of connecting points between said resistors, and an input terminal said input terminal of said resistor ladder receiving the referenced voltage signal;
      a voltage follower circuit having an input terminal connected to one of said connecting points for current-amplifying a portion of the reference voltage signal input to said reference voltage input terminal to produce a current-amplified reference voltage signal; and
      an output circuit for outputting an output signal from said microcomputer to an external destination, wherein the current-amplified reference voltage signal is supplied as a power signal to said output circuit.

2. The microcomputer according to claim 1, wherein said output circuit has a P-channel field effect transistor and an N-channel field effect transistor connected in series.

3. A microcomputer comprising:
   an operation circuit for performing an operation using a reference voltage signal and including:
      a reference voltage input terminal for receiving the reference voltage signal from outside said microcomputer;
      an analog-to-digital converter for converting an analog signal to a digital signal and having a resistor ladder including a plurality of resistors connected in series, a plurality of connection points between said resistors, and an input terminal, said input terminal of said resistor ladder receiving the referenced voltage signal; and
      an output circuit for outputting an output signal from said microcomputer to an external destination, said output circuit having an input terminal connected to one of said connecting points so that a portion of the reference voltage signal input through said reference voltage input terminal is supplied as power signal to said output circuit, said output circuit having a P-channel field effect transistor and an N-channel field effect transistor connected in series.

4. A microcomputer comprising:
   an operation circuit for performing an operation using a reference voltage signal and including:
      a reference voltage input terminal for receiving the reference voltage signal from outside said microcomputer;
      analog-to-digital converter for converting an analog signal to a digital signal and having a resistor ladder including a plurality of resistors connected in series, a plurality of connecting points between said resistors, an input terminal, and a switch controlled by software for selectively making an electrical connection to said connecting points, said input terminal of said resistor ladder receiving the referenced voltage signal;
      a voltage follower circuit having an input terminal connected to said switch for current-amplifying a portion of the reference voltage signal input to said reference voltage input terminal to produce a current-amplified reference voltage signal; and
      an output circuit for outputting an output signal from said microcomputer to an external destination, wherein the current-amplified reference voltage signal is supplied as a power signal to said output circuit.

5. A microcomputer comprising:
   an operation circuit for performing an operation using a reference voltage signal and including:
      a reference voltage input terminal for receiving the reference voltage signal from outside said microcomputer;
      an analog-to-digital converter for converting an analog signal to a digital signal and having a resistor ladder including a plurality of resistors connected in series, a plurality of connecting points between said resistors, an input terminal, and a switch controlled by software for selectively making an electrical connection to said connecting points, said input terminal of said resistor ladder receiving the referenced voltage signal; and an output circuit for outputting an output signal from said microcomputer to an external destination, said output circuit having an input terminal coupled to said switch so that a portion of the reference voltage signal input through said reference voltage input terminal is supplied as a power signal to said output circuit, said output circuit having a P-channel field effect transistor and an N-channel field effect transistor connected in series.

6. The microcomputer according to claim 5, further comprising a voltage follower circuit connected between said switch and said input terminal of said output circuit for current-amplifying a portion of the reference voltage signal input to said reference voltage input terminal to produce a current-amplified reference voltage signal supplied as the power signal to said input terminal of said output circuit.

* * * * *